United States Patent
Kwon et al.

(10) Patent No.: US 9,059,474 B2
(45) Date of Patent: *Jun. 16, 2015

(54) CABLE-TYPE SECONDARY BATTERY

(71) Applicant: LG Chem, Ltd., Seoul (KR)

(72) Inventors: Yo-Han Kwon, Daejeon (KR); Sang-Wook Woo, Daejeon (KR); Hyo-Mi Kim, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/285,761

(22) Filed: May 23, 2014

(65) Prior Publication Data

US 2014/0272506 A1 Sep. 18, 2014

Related U.S. Application Data

(63) Continuation of application No. PCT/KR2014/000064, filed on Jan. 3, 2014.

(30) Foreign Application Priority Data

Jan. 3, 2013 (KR) .................. 10-2013-0000526

(51) Int. Cl.
*H01M 4/00* (2006.01)
*H01M 10/04* (2006.01)
*H01M 2/30* (2006.01)
(Continued)

(52) U.S. Cl.
CPC ............ *H01M 10/0431* (2013.01); *H01M 2/30* (2013.01); *H01M 4/75* (2013.01); *H01M 10/0436* (2013.01); *H01R 2103/00* (2013.01); *H01R 24/58* (2013.01); *H01R 31/06* (2013.01); *H01R 2101/00* (2013.01)

(58) Field of Classification Search
None
See application file for complete search history.

(56) References Cited

U.S. PATENT DOCUMENTS 5,001,023 A 3/1991 Cheshire et al.
2008/0137890 A1* 6/2008 Petersen et al. ............... 381/323
(Continued)

FOREIGN PATENT DOCUMENTS

JP 08088019 4/1996
JP 2001-110244 A 4/2001
(Continued)

OTHER PUBLICATIONS

Ahn et al. Thread-type flexible battery, Oct. 17, 2005 (publication date), 10-2004-0025127 (Korean Application number).*

*Primary Examiner* — Patrick Ryan
*Assistant Examiner* — Jose Colucci Rios
(74) *Attorney, Agent, or Firm* — Lerner, David, Littenberg, Krumholz & Mentlik, LLP

(57) ABSTRACT

Disclosed is a cable-type secondary battery comprising at least one inner electrode layer including an inner electrode active material formed on a surface of an inner current collector having a horizontal cross section of a predetermined shape and extending in a lengthwise direction, a separation layer formed to surround the inner electrode layer, and an outer electrode layer formed to surround the separation layer and including an outer electrode active material formed on a surface of an outer current collector, and the cable-type secondary battery further comprises a first connection terminal that is electrically connected to the outer current collector and formed at one end of the cable-type secondary battery, and a second connection terminal that is electrically connected to the inner current collector and formed at the other end of the cable-type secondary battery.

14 Claims, 14 Drawing Sheets

(51) Int. Cl.
  *H01M 4/75*  (2006.01)
  *H01R 103/00*  (2006.01)
  *H01R 24/58*  (2011.01)
  *H01R 31/06*  (2006.01)
  *H01R 101/00*  (2006.01)

(56) References Cited

U.S. PATENT DOCUMENTS

2011/0091753 A1* 4/2011 Wang et al. .................. 429/94
2011/0274954 A1 11/2011 Cho et al.
2012/0121957 A1 5/2012 Kwon et al.
2012/0156554 A1 6/2012 Kwon et al.
2013/0344363 A1* 12/2013 Upadhyaya .................. 429/94

FOREIGN PATENT DOCUMENTS

| KR | 20100077692 A | 7/2010 |
| KR | 2012-0047555 A | 5/2012 |
| KR | 20120051135 A | 5/2012 |
| WO | 2014175557 A1 | 10/2014 |

* cited by examiner (a)

(b)

(a)

(b)

CABLE-TYPE SECONDARY BATTERY

CROSS-REFERENCE TO RELATED APPLICATION

The present application is a continuation of International Application No. PCT/KR2014/000064 filed on Jan. 3, 2014, which claims priority to Korean Patent Application No. 10-2013-0000526 filed in the Republic of Korea on Jan. 3, 2013, the disclosures of which are incorporated herein by reference.

TECHNICAL FIELD

The present disclosure relates to a cable-type secondary battery, and more particularly, to a cable-type secondary battery that is easy to connect through a connection terminal.

BACKGROUND ART

With the increasing development and consumption of mobile devices, electric vehicles, hybrid vehicles, power storage systems, uninterrupted power supplies, or the like, the consumption of secondary batteries as energy sources are rapidly increasing as well as its various forms thereof. Therefore, batteries are being studied very actively to cope with such diverse demands.

A secondary battery is a device that stores electrical energy supplied from an external source in a chemical form, and when needed, converts chemical energy to electrical energy. In the sense of being recharged many times, a secondary battery is also referred to as a rechargeable battery. Common secondary batteries include a lead storage battery, a Ni—Cd battery, a Ni-MH storage battery, a Li-ion battery, a Li-ion polymer battery, and the like. When compared to a disposable primary battery, not only is a secondary battery more economically efficient, it is also more environmentally friendly.

A majority of secondary batteries being currently used are cylindrical, prismatic, or pouch-type secondary batteries. These secondary batteries are classified into a pouch-type secondary battery, a cylindrical secondary battery, and a prismatic secondary battery based on a type of an outer case. Because secondary batteries are manufactured by mounting an electrode assembly including an anode, a cathode, and a separator in a cylindrical or prismatic metal case or a pouch-shaped case of an aluminum laminate sheet, and injecting an electrolyte into the electrode assembly, they have advantages of easy manufacturing and a low manufacturing cost. However, where a predetermined mounting space is necessarily required, secondary batteries have a disadvantage of limited shape adaptation. As a result, the cylindrical, prismatic or pouch shape of the secondary batteries is a limitation in developing various shapes of mobile devices. Accordingly, there is a need for a new type of secondary battery that is easily adaptable in shape.

To fulfill this need, suggestions have been made to develop a cable-type secondary battery having a very high ratio of length to cross-sectional diameter. Korean Patent Application publication No. 2005-99903 discloses an adaptable battery consisting of an inner electrode, an outer electrode, and an electrolyte layer interposed therebetween. However, such secondary battery has an elongated shape, and thus, mainly features a so-called cable structure whereby the secondary battery is able to stretch and retract in a lengthwise direction.

Meanwhile, studies are being actively made on a connection terminal to connect a cable-type secondary battery to a device to supply power or connect to a charger to receive a charging power.

DISCLOSURE

Technical Problem

The present disclosure is designed to solve the problem of the related art, and therefore, the present disclosure is directed to providing a cable-type secondary battery that is easy to connect through a connection terminal.

Technical Solution

To achieve the above object, a cable-type secondary battery according to the present disclosure includes at least one inner electrode layer including an inner electrode active material formed on a surface of an inner current collector having a horizontal cross section of a predetermined shape and extending in a lengthwise direction, a separation layer formed to surround the inner electrode layer, and an outer electrode layer formed to surround the separation layer, and including an outer electrode active material formed on a surface of an outer current collector, and the cable-type secondary battery further includes a first connection terminal that is electrically connected to the outer current collector and formed at one end of the cable-type secondary battery, and a second connection terminal that is electrically connected to the inner current collector and formed at the other end of the cable-type secondary battery.

According to one embodiment of the present disclosure, the first and second connection terminals are an earphone plug-shaped terminal. In this instance, a diameter of the earphone plug-shaped terminal may be 3.5 mm.

According to one embodiment of the present disclosure, the first and second connection terminals have at least one type selected from the group consisting of male-male, male-female, female-male, and female-female.

The cable-type secondary battery according to the present disclosure may further include a protection coating surrounding the outer electrode layer.

According to one embodiment of the present disclosure, the inner current collector may be a pipe-type current collector, a wound wire-type current collector, a wound sheet-type current collector, or a mesh-type current collector.

According to one embodiment of the present disclosure, the outer current collector may be a pipe-type current collector, a wound wire-type current collector, a wound sheet-type current collector, or a mesh-type current collector.

According to one embodiment of the present disclosure, the inner electrode layer is a negative or positive electrode, and the outer electrode layer is a positive or negative electrode opposite to the inner electrode layer.

The cable-type secondary battery according to the present disclosure may be one component of a battery module including a plurality of cable-type secondary batteries. In this instance, for the plurality of cable-type secondary batteries, the first connection terminal is a male or female terminal and the second connection terminal is a female or male terminal matching to the first connection terminal, and the plurality of cable-type secondary batteries are electrically connected in series.

The cable-type secondary battery according to the present disclosure may be one component of a secondary battery operating system including a load that is supplied with power from the cable-type secondary battery. In this instance, the load includes first and second coupling terminals that are coupled with the first and second connection terminals of the cable-type secondary battery. Meanwhile, the load may be an electric bike, a power tool, an energy storage system, an uninterruptible power supply (UPS), a mobile computer, a mobile information communication terminal, a portable audio player, or a portable video player.

The cable-type secondary battery according to the present disclosure may be one component of a cable-type secondary battery connection set including the cable-type secondary battery and a connection device to electrically connect the cable-type secondary battery to a charger that supplies a required charging power to the cable-type secondary battery, or to a load that is supplied with power from the cable-type secondary battery. In this instance, the connection device includes first and second coupling terminals that are coupled with the first and second connection terminals of the cable-type secondary battery, and a third coupling terminal to electrically connect the first and second coupling terminals respectively to a positive or negative electrode of the charger or the load. Meanwhile, the third coupling terminal of the connection device is of a universal series bus (USB) terminal type.

To achieve the above object, a cable-type secondary battery according to the present disclosure includes at least one inner electrode layer including an inner electrode active material formed on a surface of an inner current collector having a horizontal cross section of a predetermined shape and extending in a lengthwise direction, a separation layer formed to surround the inner electrode layer, and an outer electrode layer formed to surround the separation layer, and including an outer electrode active material formed on a surface of an outer current collector, and the cable-type secondary battery further includes a first connection terminal that is electrically connected to the inner current collector and the outer current collector, and formed at one end of the cable-type secondary battery, and a second connection terminal that is electrically connected to the inner current collector and the outer current collector, and formed at the other end of the cable-type secondary battery.

The cable-type secondary battery according to the present disclosure may be one component of a battery module including a plurality of cable-type secondary batteries. In this instance, the first connection terminal is a male or female terminal and the second connection terminal is a female or male terminal matching to the first connection terminal, and the plurality of cable-type secondary batteries are electrically connected in parallel.

The cable-type secondary battery according to the present disclosure may be one component of a secondary battery operating system including a load that is supplied with power from the cable-type secondary battery. In this instance, the load includes a first coupling terminal that is coupled with and electrically connected to only one electrode among the negative and positive electrodes of the first connection terminal of the cable-type secondary battery, and a second coupling terminal that is coupled with and electrically connected to only an electrode (positive or negative) opposite to the first coupling terminal, among the negative and positive electrodes of the second connection terminal of the cable-type secondary battery. Meanwhile, the load may be an electric bike, a power tool, an energy storage system, an uninterruptible power supply (UPS), a mobile computer, a mobile information communication terminal, a portable audio player, or a portable video player.

The cable-type secondary battery according to the present disclosure may be one component of a cable-type secondary battery connection set including the cable-type secondary battery, and a connection device to electrically connect the cable-type secondary battery to a charger that supplies a required charging power to the cable-type secondary battery, or to a load that is supplied with power from the cable-type secondary battery. In this instance, the connection device includes a first coupling terminal that is coupled with and electrically connected to only one electrode among the negative and positive electrodes of the first connection terminal, a second coupling terminal that is coupled with and electrically connected to only an electrode (positive or negative) opposite to the first coupling terminal, among the negative and positive electrodes of the second connection terminal, and a third coupling terminal to electrically connect the first and second coupling terminals respectively to a positive or negative electrode of the charger or the load. Meanwhile, the third coupling terminal of the connection device may be of a universal series bus (USB) terminal type.

Advantageous Effects

According to one aspect of the present disclosure, connecting a cable-type secondary battery to a charger or a load is facilitated.

According to another aspect of the present disclosure, a battery module may be easily built by electrically connecting cable-type secondary batteries in series or parallel.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
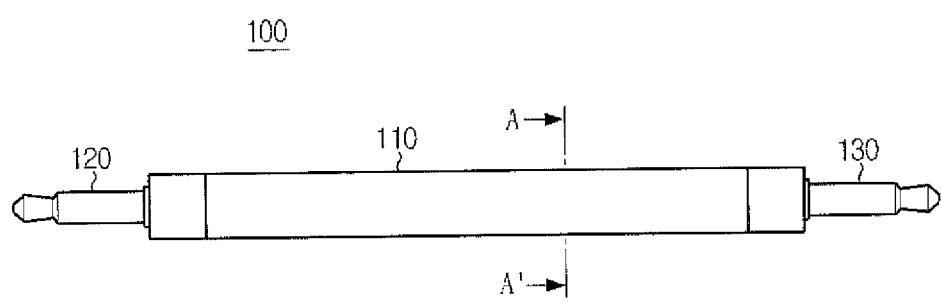
FIG. 1 is a front view schematically illustrating a construction of a cable-type secondary battery according to an exemplary embodiment of the present disclosure.

FIG. 1 is a front view schematically illustrating a construction of a cable-type secondary battery 100 according to an exemplary embodiment of the present disclosure.

Referring to FIG. 1, the cable-type secondary battery 100 according to the present disclosure includes a secondary battery body 110, a first connection terminal 120, and a second connection terminal 130.

The secondary battery body 110 is formed of an elongated shape and has a cable structure of being able to stretch and retract in a lengthwise direction. The secondary battery body 110 is configured to store electrical energy supplied from an external source in a chemical form, and when needed, convert chemical energy to electrical energy and supply it to an external destination.

Figure 2:
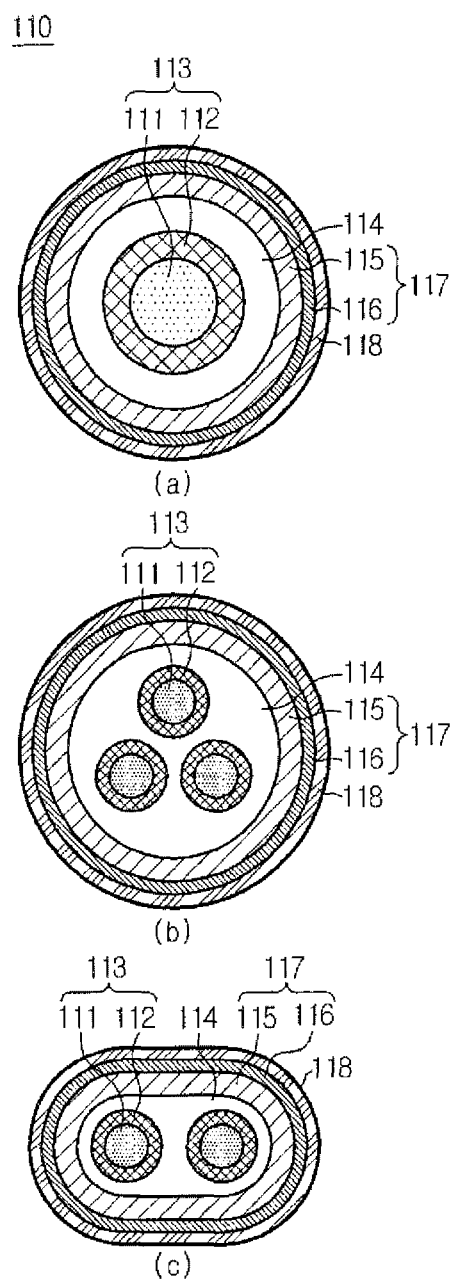
FIG. 2 is a cross-sectional view illustrating a structure of a secondary battery body shown in FIG. 1, taken along the line A-A'.

FIG. 2 is a cross-sectional view illustrating a structure of the secondary battery body 110 shown in FIG. 1, taken along the line A-A'.

Referring to FIG. 2(a), the secondary battery body 110 according to an exemplary embodiment of the present disclosure includes an inner current collector 111 having a horizontal cross section of a predetermined shape and extending in a lengthwise direction, and an inner electrode active material 112 formed on a surface of the inner current collector 111. Here, the predetermined shape implies that there is no particular limitation on a shape, and any shape is possible so long as it does not damage the essence of the present disclosure. The horizontal cross section of the inner current collector 111 may be of a circular or polygonal shape, and the circular shape may correspond to a circular structure of geometrically perfect symmetry and an asymmetrical oval structure. The polygonal shape is not particularly limited, and may be, as a non-limiting example, a triangle, a square, a pentagon, or a hexagon. However, in the manufacturing process, a pipe-type current collector, a wound wire-type current collector, a wound sheet-type current collector, or a mesh-type current collector may be used.

Meanwhile, in the specification, a part including the inner current collector 111 and the inner electrode active material 112 will be referred to as an inner electrode layer 113. The secondary battery body 110 may include at least two inner current collectors 111 as shown in FIGS. 2(b) and 2(c). The secondary battery body 110 of FIG. 2(b) has a circular shape of perfect symmetry, and the secondary battery body 110 of FIG. 2(c) has an asymmetrical oval shape, and as illustrated, various shapes are possible. Also, the plurality of inner electrode layers 111 may be not only arranged in parallel but also twisted. The secondary battery body 110 of FIG. 2(b) has three inner electrode layers 111, and the secondary battery body 110 of FIG. 2(c) has two inner electrode layers 111.

In the case where the secondary battery body 110 includes a plurality of inner electrode layers 111, a surface area in contact with an outer electrode layer 117 increases, leading to a high battery rate and excellent battery performance. Also, according to characteristics of an adaptable cable-type secondary battery, a short circuit may occur to an electrode due to repeated use, but in the case where a plurality of electrodes are used, a secondary battery can operate even if a short circuit occurs in any one inner electrode layer 111. Also, in the case where the inner electrode layer 111 having a lower capacity per volume than the outer electrode layer 117 is used, it is easy to adjust capacity balance of the inner electrode layer 111 and the outer electrode layer 117 because a number of the inner electrode layers 111 can be adjusted.

A separation layer 114 is formed on an outer surface of the inner electrode layer 113 to surround the inner electrode layer 113. The separation layer 114 includes an electrolyte that provides a passage of ions. Also, the outer electrode layer 117 is formed on an outer surface of the separation layer 114 to surround the separation layer 114.

In the specification, the outer electrode layer 117 represents a part including an outer current collector 116 corresponding to the inner current collector 111 and an outer electrode active material 115 formed on a surface of the outer current collector 116. The outer current collector 116 may also use a pipe-type current collector, a wound wire-type current collector, a wound sheet-type current collector, or a mesh-type current collector, in the manufacturing process.

The inner current collector 111 and the outer current collector 116 serve to collect electrons produced by electrochemical reactions of the inner electrode active material 112 and the outer electrode active material 115 or to provide electrons required for electrochemical reactions, and generally, use a metal such as copper or aluminum. However, recently, to improve flexibility of the secondary battery body 110 and ensure lightweight of the secondary battery body 110, a conductive polymer such as polypyrrole may be used as a current collector. However, the present disclosure is not limited by the material of the inner current collector 111 and the outer current collector 116.

The inner electrode layer 113 of the present disclosure may be a negative or positive electrode, and the outer electrode layer 117 may be a positive or negative electrode, opposite to the inner electrode layer 113. However, in the specification, for the convenience of description, a description will be provided on condition that the inner electrode layer 113 is set to a negative electrode and the outer electrode layer 117 is set to a positive electrode.

Preferably, the secondary battery body 110 may further include a protection coating 118 surrounding the outer electrode layer 117.

Referring to FIG. 1 again, the first connection terminal 120 is formed at one end of the secondary battery body 110. Also, the second connection terminal 130 is formed at the other end of the secondary battery body 110 where the first connection terminal 120 is absent.

The first connection terminal 120 is electrically connected to the outer current collector 116, and the second connection terminal 130 is electrically connected to the inner current collector 111. Accordingly, in this embodiment, the first connection terminal 120 becomes a positive connection terminal, and the second connection terminal 130 becomes a negative connection terminal. Also, in other embodiments, the first connection terminal 120 may become a negative connection terminal, and the second connection terminal 130 may become a positive connection terminal.

According to one embodiment of the present disclosure, the first and second connection terminals 120 and 130 may be an earphone plug-shaped terminal. In the specification, the 'earphone plug-type terminal' is a circular plug as shown in FIG. 1, and has a standardized diameter. A diameter of a most common earphone plug is 3.5 mm, and the first and second connection terminals 120 and 130 may also have a standardized diameter. The circular plug is widely used as a plug for connecting an earphone to a portable audio player such as a CD player and an MP3 player, or a portable video player, a mobile computer, and the like. Accordingly, in the case where the first and second connection terminals 120 and 130 are an earphone plug-shaped terminal, compatibility with an existing device is good.

Meanwhile, in the specification, the 'earphone plug-type terminal' does not merely indicate an insert-type plug shown in FIG. 1. The 'earphone plug-type terminal' also includes a plug having a coupling hole corresponding to an insert-type plug shown in FIG. 1. Hereinafter, in the earphone plug-type terminal, a terminal having a coupling hole is referred to as a 'female' terminal, and a terminal having an insert-type plug is referred to as a 'male' terminal. These names are being widely used in the art.

Figure 3:
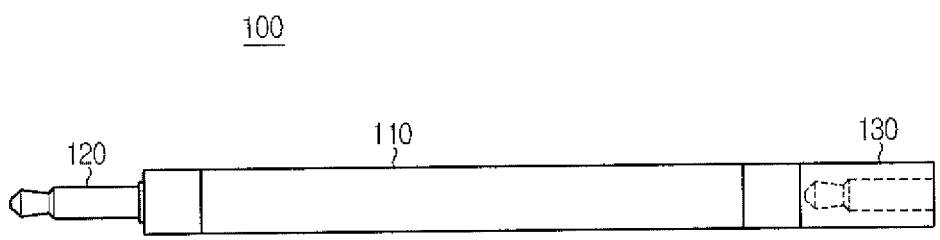
FIGS. 3 and 4 are front views, each schematically illustrating a construction of a cable-type secondary battery according to another exemplary embodiment of the present disclosure.
Figure 4:
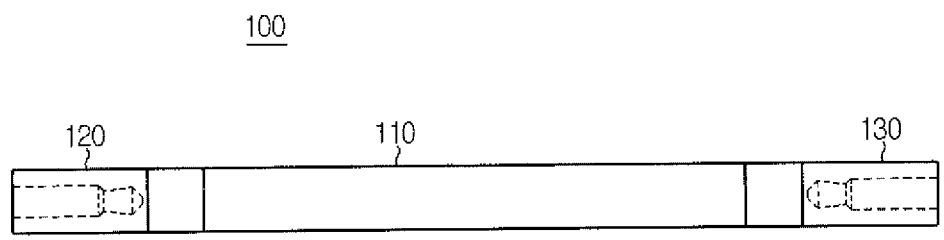

FIGS. 3 and 4 are front views, each schematically illustrating a construction of the cable-type secondary battery 100 according to another exemplary embodiment of the present disclosure.

Referring to FIG. 3, the first connection terminal 120 is a male terminal, and the second connection terminal 130 is a female terminal. Also, referring to FIG. 4, both the first and second connection terminals 120 and 130 are female terminals. As seen through the embodiments shown in FIGS. 1, 3, and 4, the first and second connection terminals 120 and 130 of the present disclosure may have at least one type selected from the group consisting of male-male, male-female, female-male, and female-female.

The cable-type secondary battery 100 according to the present disclosure may be one component of a battery module 140.

Figure 5:
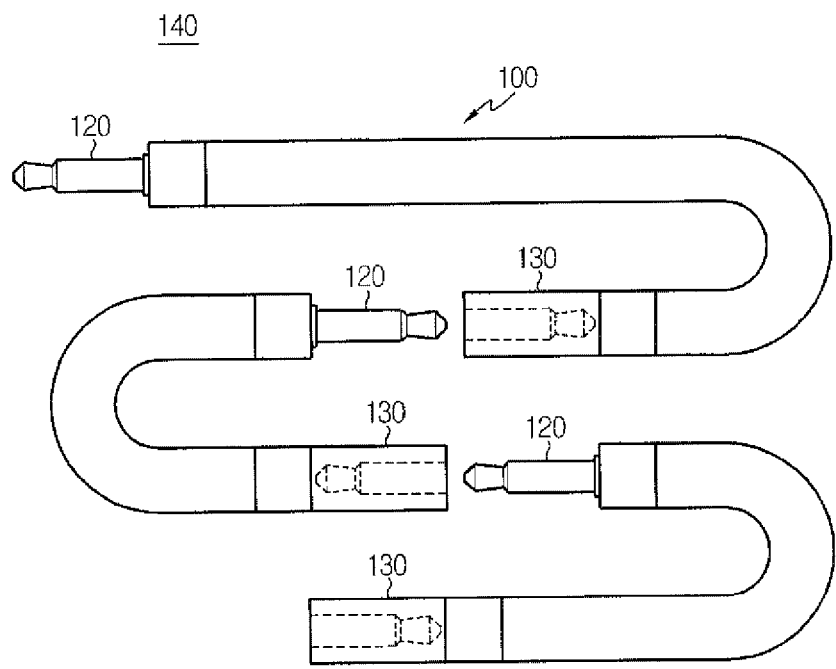
FIG. 5 is a diagram schematically illustrating a construction of a battery module according to an exemplary embodiment of the present disclosure.

FIG. 5 is a diagram schematically illustrating a construction of the battery module 140 according to an exemplary embodiment of the present disclosure.

Referring to FIG. 5, three cable-type secondary batteries 100 according to the present disclosure may be arranged in a line to connect to one another. However, it is obvious that a number of the cable-type secondary batteries 100 included in the battery module 140 according to the present disclosure may be various. In the cable-type secondary battery 100, the first connection terminal 120 is a male terminal, and the second connection terminal 130 is a female terminal. Also, according to embodiments, the first connection terminal 120 may be a female terminal, and the second connection terminal 130 may be a male terminal.

In this embodiment, the first connection terminal 120 is positive, and the second connection terminal 130 is negative. Accordingly, as shown in FIG. 5, the battery module 140 including the cable-type secondary batteries 100 electrically connected in series is built by arranging the plurality of cable-type secondary batteries 100 in a line, and coupling the second connection terminal 130 of the cable-type secondary battery in front with the first connection terminal 120 of the cable-type secondary battery in back. A general lithium polymer battery has an operating voltage from about 3.7V to 4.0V. Accordingly, in the case of a device requiring a high voltage above the range of 3.7V to 4.0V, a high voltage battery module may be easily constructed by connecting the cable-type secondary batteries 100 according to the present disclosure in series.

The cable-type secondary battery 100 according to the present disclosure may be one component of a secondary battery operating system 150 including a load 151 that is supplied with power from the cable-type secondary battery 100.

Figure 6:
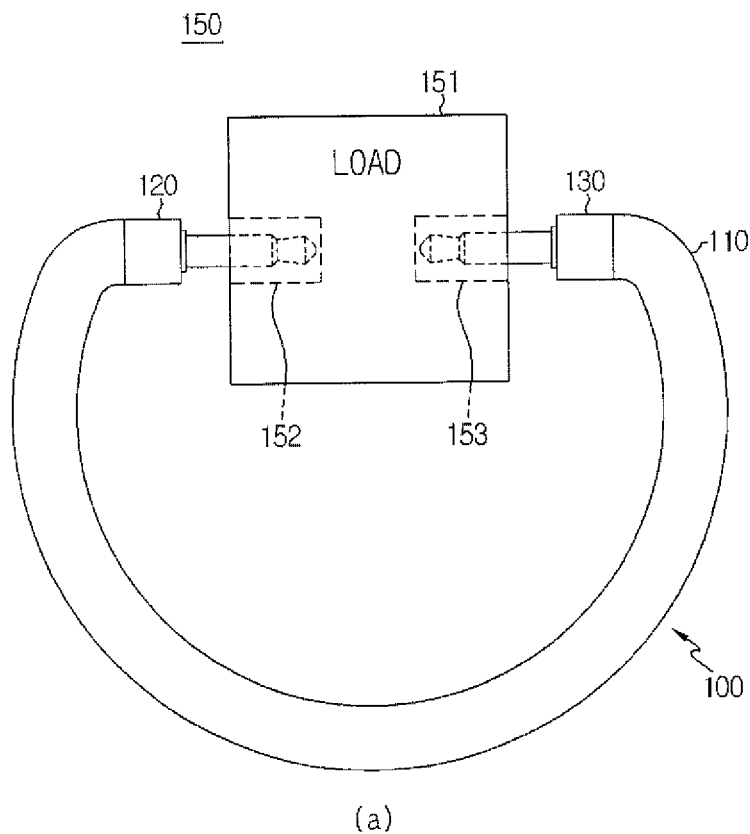
FIG. 6 is a diagram schematically illustrating a construction of a secondary battery operating system including a cable-type secondary battery according to an exemplary embodiment of the present disclosure.
Figure 6:
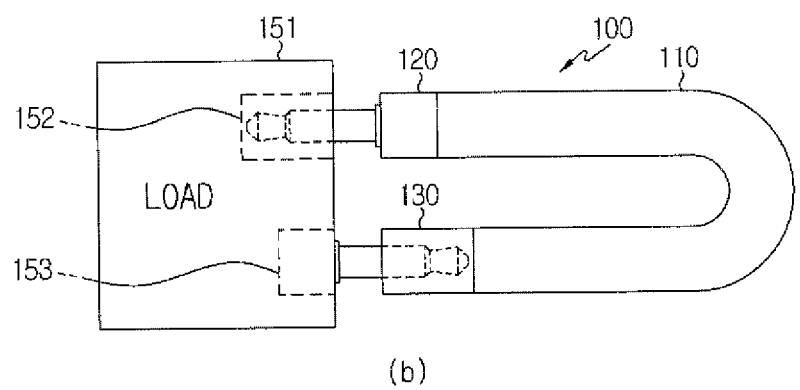

FIG. 6 is a diagram schematically illustrating a construction of the secondary battery operating system 150 including the cable-type secondary battery 100 according to an exemplary embodiment of the present disclosure.

Referring to FIG. 6, the secondary battery operating system 150 according to the present disclosure includes the cable-type secondary battery 100 and the load 151. Since the cable-type secondary battery 100 is described in detail in the foregoing, a repeated description is omitted herein. The load 151 may include various devices, for example, an electric bike, a power tool, an energy storage system, an uninterruptible power supply (UPS), a mobile computer, a mobile information communication terminal, a portable audio player or a portable video player, and the like.

The load 151 is supplied with power from the cable-type secondary battery 100 according to the present disclosure. For this, the load 151 includes first and second coupling terminals 152 and 153 coupled with the first and second connection terminals 120 and 130 of the cable-type secondary battery 100 according to the present disclosure.

Also, the first and second coupling terminals 152 and 153 have a plug type matching to the plug type of the first and second connection terminals 120 and 130. FIG. 6(a) is an embodiment in which both the first and second connection terminals 120 and 130 of the cable-type secondary battery 100 are male terminals. Thus, both the first and second coupling terminals 152 and 153 of the load 151 are female terminals. Also, FIG. 6(b) is an embodiment in which the first connection terminal 120 of the cable-type secondary battery 100 is a male terminal, and the second connection terminal 130 is a female terminal. Thus, the first coupling terminal 152 of the load 151 is a female terminal, and the second coupling terminal 153 is a male terminal.

In the secondary battery operating system 150 according to the present disclosure, the first and second connection terminals 120 and 130 of the cable-type secondary battery 100 and the first and second coupling terminals 152 and 153 of the load 151 may have matching plug types by various combinations. However, the present disclosure is not limited by the plug combinations of the first and second connection terminals 120 and 130 of the cable-type secondary battery 100 and the first and second coupling terminals 152 and 153 of the load 151.

The cable-type secondary battery 100 according to the present disclosure may be one component of a secondary battery connection set 160 including a connection device 161 to electrically connect the cable-type secondary battery 100 to a charger that supplies a required charging power to the cable-type secondary battery 100 or the load 151 that is supplied with power from the cable-type secondary battery 100.

Figure 7:
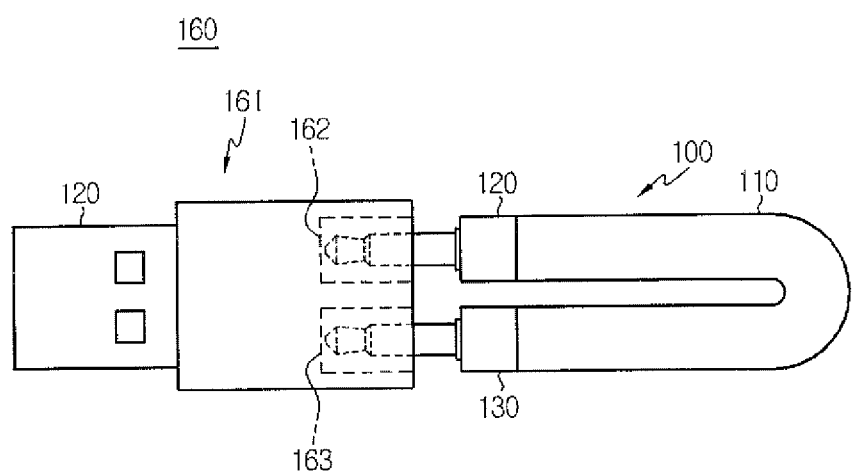
FIG. 7 is a diagram schematically illustrating a construction of a secondary battery connection set including a cable-type secondary battery according to an exemplary embodiment of the present disclosure.

FIG. 7 is a diagram schematically illustrating a construction of the secondary battery connection set 160 including the cable-type secondary battery 100 according to an exemplary embodiment of the present disclosure.

Referring to FIG. 7, the secondary battery connection set 160 according to the present disclosure includes the cable-type secondary battery 100 and the connection device 161. Since the cable-type secondary battery 100 is described in detail in the foregoing, a repeated description is omitted herein. The connection device 161 is a device used to electrically connect the cable-type secondary battery 100 to a charger that supplies a required charging power to the cable-type secondary battery 100 or the load 151 that is supplied with power from the cable-type secondary battery 100. The charger or the load may include a connection terminal of a different type from the first and second connection terminals 120 and 130 of the cable-type secondary battery 100 according to the present disclosure. Accordingly, the connection device 161 serves to electrically connect the cable-type secondary battery 100 and the load having different plug types or the cable-type secondary battery 100 and the charger having different plug types.

For this, the connection device 161 includes first through third coupling terminals 162 through 164. The first and second coupling terminals 162 and 163 have a plug type matching to the plug type of the first and second connection terminals 120 and 130 of the cable-type secondary battery 100. FIG. 7 illustrates an embodiment in which both the first and second connection terminals 120 and 130 of the cable-type secondary battery 100 are male terminals. Thus, both the first and second coupling terminals 162 and 163 of the connection device 161 are female terminals. In the secondary battery connection set 160 according to the present disclosure, the first and second connection terminals 120 and 130 of the cable-type secondary battery 100 and the first and second coupling terminals 162 and 163 of the connection device 161 may have matching plug types by various combinations. However, the present disclosure is not limited by the plug combinations of the first and second connection terminals 120 and 130 of the cable-type secondary battery 100 and the first and second coupling terminals 162 and 163 of the connection device 161.

The third coupling terminal 164 serves to electrically connect the first and second coupling terminals 152 and 153 respectively to a positive or negative electrode of the charger or the load. According to one embodiment of the present disclosure, the third coupling terminal 164 may be of a universal series bus (USB) terminal type. Because a USB terminal is a known standard technology and is being widely used, its detailed description is omitted herein. The type of the third coupling terminal 164 includes non-standardized types as well as various standardized types, and the present disclosure is not limited by the type of the third coupling terminal 164.

Figure 8:
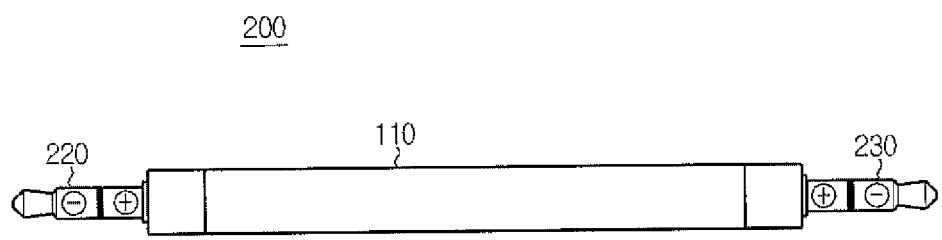
FIG. 8 is a front view schematically illustrating a construction of a cable-type secondary battery according to still another exemplary embodiment of the present disclosure.

FIG. 8 is a front view schematically illustrating a construction of a cable-type secondary battery 200 according to still another exemplary embodiment of the present disclosure.

Referring to FIG. 8, the cable-type secondary battery 200 according to the present disclosure includes the secondary battery body 110, a first connection terminal 220, and a second connection terminal 230. The secondary battery body 110 of this embodiment is the same as the secondary battery body 110 shown in FIG. 1. Accordingly, a detailed description of the secondary battery body 110 overlaps and thus is omitted herein.

The first connection terminal 220 is electrically connected to an inner current collector and an outer current collector, and is formed at one end of the secondary battery body 110. Also, the second connection terminal 230 is electrically connected to the inner current collector 111 and the outer current collector 116, and is formed at the other end of the secondary battery body 110 where the first connection terminal 220 is absent.

When compared to the first and second connection terminals 220 and 230 of the embodiment shown in FIG. 1, the first and second connection terminals 220 and 230 of FIG. 8 according to the present disclosure have a difference in that both the inner current collector 111 and the outer current collector 116 are electrically connected to one connection terminal.

Figure 9:
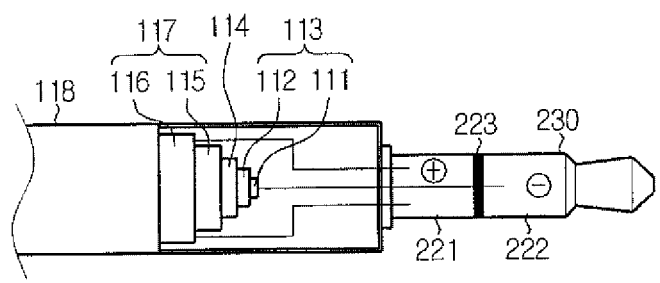
FIG. 9 is a partially cutaway diagram of a cable-type secondary battery according to an exemplary embodiment of the present disclosure.

FIG. 9 is a partially cutaway diagram of the cable-type secondary battery 200 according to an exemplary embodiment of the present disclosure.

Referring to FIG. 9, it can be seen that an inner part 221 of the plug of the second connection terminal 230 is electrically connected to the outer current collector 116, and an outer part 222 of the plug is electrically connected to the inner current collector 111. In this embodiment, the inner current collector 111 is negative, and the outer current collector 116 is positive. Accordingly, the second connection terminal 230 includes an insulation layer 223 between an electrically connected part with the inner current collector 111 and an electrically connected part with the outer current collector 116, that is, between the inner part 221 of the plug and the outer part 222 of the plug. The insulation layer 223 is made from a material having a high electrical resistance value to electrically isolate the inner current collector 111 from the outer current collector 116.

Although FIG. 9 describes the second connection terminal 230 as an example, it is obvious that the first connection terminal 220 has the same structure. Also, obviously, an embodiment in which the inner part 221 of the plug is electrically connected to the inner current collector 111 and the outer part 222 of the plug is electrically connected to the outer current collector 116 may be contemplated. In the subsequent drawings, (+) and (−) will be indicated to depict that two electrodes are formed for one plug on the first and second connection terminals 220 and 230.

According to the embodiments of the present disclosure, the first and second connection terminals 220 and 230 may be an earphone plug-shaped terminal. Since the earphone plug-shaped terminal is described in the foregoing, a repeated description is omitted herein.

Figure 10:
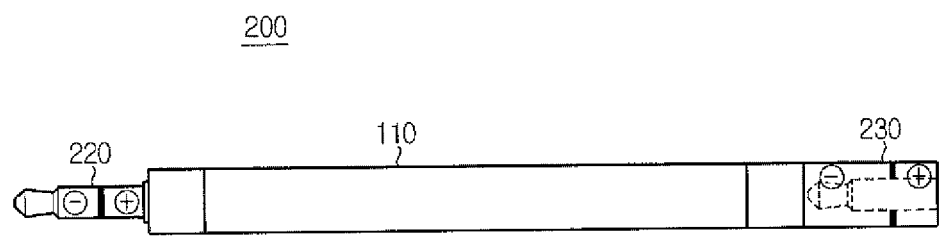
FIGS. 10 and 11 are front views, each schematically illustrating a construction of a cable-type secondary battery according to yet another exemplary embodiment of the present disclosure.
Figure 11:
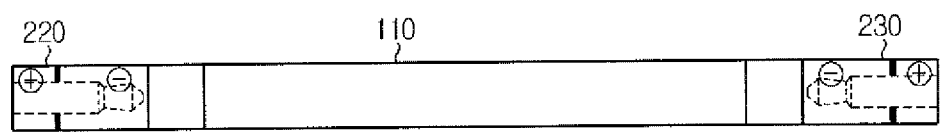

FIGS. 10 and 11 are front views, each schematically illustrating a construction of the cable-type secondary battery 200 according to yet another exemplary embodiment of the present disclosure.

Referring to FIG. 10, the first connection terminal 220 is a male terminal, and the second connection terminal 230 is a female terminal. Also, referring to FIG. 11, both the first and second connection terminals 220 and 230 are female terminals. As above, the first and second connection terminals 220 and 230 according to the present disclosure may have at least one type selected from the group consisting of male-male, male-female, female-male, and female-female.

On the male terminal, an inner part of the plug is positive (+), and an outer part of the plug is negative (−). Also, on the female terminal matching to the male terminal, an inner part of the plug is (−), and an outer part of the plug is (+). In contrast, when an inner part of the plug of the male terminal is (−) and an outer part of the plug is (+), an inner part of the plug of the female terminal is (+) and an outer part of the plug is negative (−). Like this, the male terminal and the female terminal are arranged such that matching electrodes are connected to one another, when coupled.

The cable-type secondary battery 200 according to the present disclosure may be one component of a battery module 240.

Figure 12:
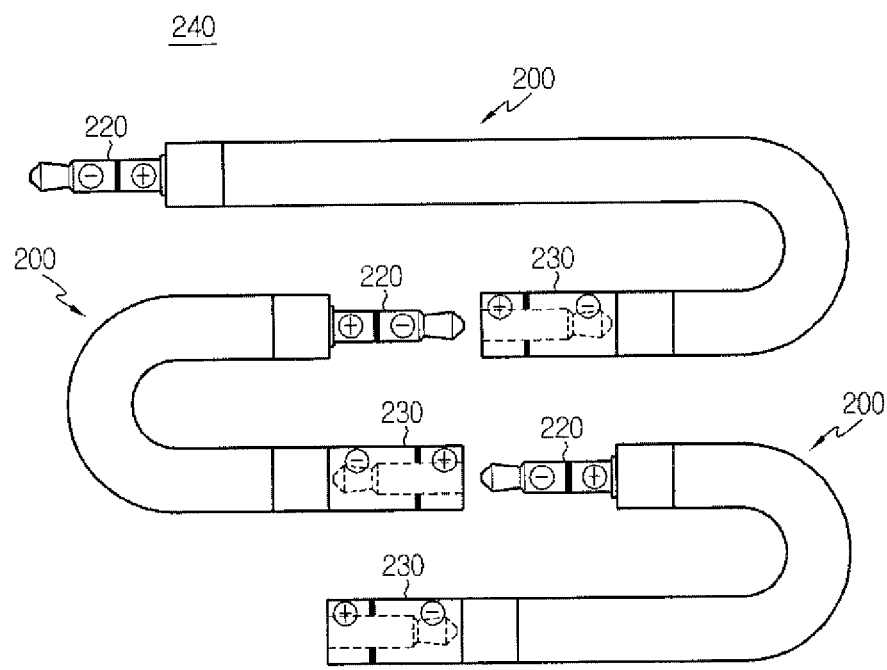
FIG. 12 is a diagram schematically illustrating a construction of a battery module according to an exemplary embodiment of the present disclosure.

FIG. 12 is a diagram schematically illustrating a construction of the battery module 240 according to an exemplary embodiment of the present disclosure.

Referring to FIG. 12, three cable-type secondary batteries 200 according to the present disclosure may be arranged in a line to connect to one another. However, it is obvious that a number of the cable-type secondary batteries 200 included in the battery module 240 according to the present disclosure may be various. In the cable-type secondary battery 200, the first connection terminal 220 is a male terminal, and the second connection terminal 230 is a female terminal. Also, according to embodiments, the first connection terminal 220 may be a female terminal, and the second connection terminal 230 may be a male terminal.

In this embodiment, an inner part of the plug of the first connection terminal 220 is (+), and an outer part of the plug is (−). Also, an inner part of the plug of the second connection terminal 230 is (−), and an outer part of the plug is (+). Accordingly, as shown in FIG. 12, the battery module 240 including the cable-type secondary batteries 200 electrically connected in parallel is built by arranging the plurality of cable-type secondary batteries 200 in a line, and coupling the second connection terminal 230 of the cable-type secondary battery in front with the first connection terminal 220 of the cable-type secondary battery in back. Secondary batteries connected in parallel have an increase in charge capacity. Accordingly, a high capacity battery module may be easily built by connecting the cable-type secondary batteries 200 according to the present disclosure in parallel.

The cable-type secondary battery 200 according to the present disclosure may be one component of a secondary battery operating system 250 including a load 251 that is supplied with power from the cable-type secondary battery 200.

Figure 13:
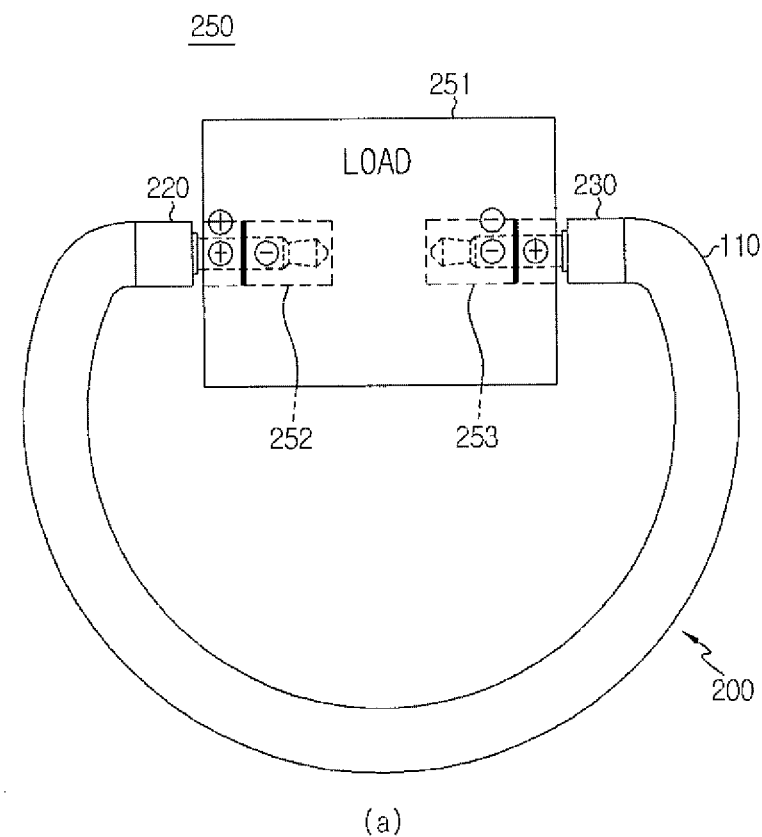
FIG. 13 is a diagram schematically illustrating a construction of a secondary battery operating system including a cable-type secondary battery according to the present disclosure.
Figure 13:
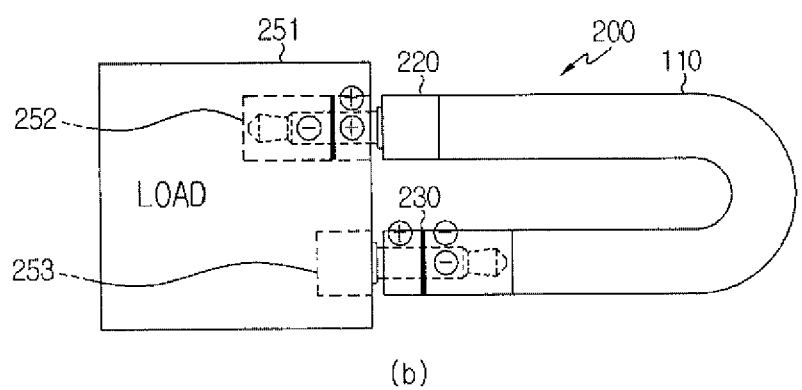

FIG. 13 is a diagram schematically illustrating a construction of the secondary battery operating system 250 including the cable-type secondary battery 200 according to the present disclosure.

Referring to FIG. 13, the secondary battery operating system 250 according to the present disclosure includes the cable-type secondary battery 200 and the load 251. Since the cable-type secondary battery 200 is described in detail in the foregoing, a repeated description is omitted herein. The load 251 may include various devices, for example, an electric bike, a power tool, an energy storage system, an uninterruptible power supply (UPS), a mobile computer, a mobile information communication terminal, a portable audio player or a portable video player, and the like.

The load 251 is supplied with power from the cable-type secondary battery 200 according to the present disclosure. For this, the load 251 includes first and second coupling terminals 252 and 253 coupled with the first and second connection terminals 220 and 230 of the cable-type secondary battery 200 according to the present disclosure.

Also, the first and second coupling terminals 252 and 253 have a plug type matching to the plug type of the first and second connection terminals 220 and 230. FIG. 13(a) is an embodiment in which both the first and second connection terminals 220 and 230 of the cable-type secondary battery 200 are male terminals. Thus, both the first and second coupling terminals 252 and 253 of the load 251 are female terminals. Also, FIG. 13(b) is an embodiment in which the first connection terminal 220 of the cable-type secondary battery 200 is a male terminal, and the second connection terminal 230 is a female terminal. Thus, the first coupling terminal 252 of the load 251 is a female terminal, and the second coupling terminal 253 is a male terminal.

The first coupling terminal 252 is electrically connected to only one electrode among a negative electrode or a positive electrode of the first connection terminal 220. Also, the second coupling terminal 253 is electrically connected to only an electrode (positive or negative) opposite to the first coupling terminal, among a negative electrode or a positive electrode of the second connection terminal 230. That is, for each of the first and second connection terminals 220 and 230, only one electrode is electrically connected, and in this instance, the connected electrodes of the first and second connection terminals 220 and 230 have opposite polarities. Accordingly, as shown in the embodiment shown in FIG. 13(a), in the case where the first and second connection terminals 220 and 230 of the cable-type secondary battery 200 are the same male terminal type, a user does not need to determine which couple terminal of the load 251 is to be coupled with the connection terminal. Among the above-described connection terminals, any connection terminal can be electrically connected to one electrode respectively if it is coupled with the coupling terminals 252 and 253 equipped in the load 251.

In the secondary battery operating system 250 according to the present disclosure, the first and second connection terminals 220 and 230 of the cable-type secondary battery 200 and the first and second coupling terminals 252 and 253 of the load 251 may have matching plug types by various combinations. However, the present disclosure is not limited by the plug combinations of the first and second connection terminals 220 and 230 of the cable-type secondary battery 200 and the first and second coupling terminals 252 and 253 of the load 251. Also, placement of (+) and (−) electrodes on each of the connection terminal 220 and 230 and each of the coupling terminals 252 and 253 is not limited to the above embodiments.

The cable-type secondary battery 200 according to the present disclosure may be one component of a secondary battery connection set 260 including a connection device 261 to electrically connect the cable-type secondary battery 200 to a charger that supplies a required charging power to the cable-type secondary battery 200 or the load 251 that is supplied with power from the cable-type secondary battery 200.

Figure 14:
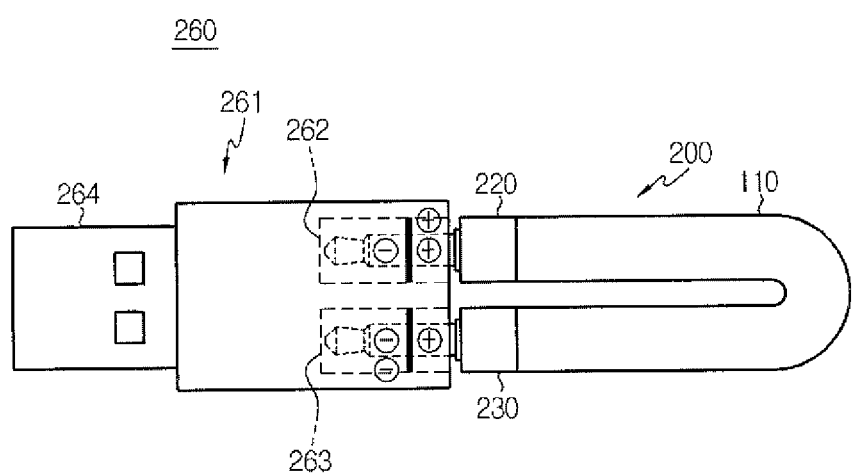
FIG. 14 is a diagram schematically illustrating a construction of a secondary battery connection set including a cable-type secondary battery according to the present disclosure.

FIG. 14 is a diagram schematically illustrating a construction of the secondary battery connection set 260 including the cable-type secondary battery 200 according to the present disclosure.

Referring to FIG. 14, the secondary battery connection set 260 according to the present disclosure includes the cable-type secondary battery 200 and the connection device 261. Since the cable-type secondary battery 200 is described in detail in the foregoing, a repeated description is omitted herein. When the connection device 261 is compared to the connection device 161 shown in FIG. 7 previously, there is just a difference in structure of the first and second coupling terminals 262 and 263, and the rest is the same. Accordingly, only the structural difference of the first and second coupling terminals 262 and 263 is described and the rest overlaps and thus is omitted herein.

The first coupling terminal 262 is electrically connected to only one electrode among a negative electrode or a positive electrode of the first connection terminal 220. Also, the second coupling terminal 263 is electrically connected to only an electrode (positive or negative) opposite to the first coupling terminal 262, among a negative electrode or a positive electrode of the second connection terminal 230. Similar to the first and second connection terminals 220 and 230 of the secondary battery operating system 250 described in the foregoing, for each of the first and second connection terminals 220 and 230, only one electrode is electrically connected. In this instance, the connected electrodes of the first and second connection terminals 220 and 230 have opposite polarities. Accordingly, as shown in the embodiment shown in FIG. 14, in the case where the first and second connection terminals 220 and 230 of the cable-type secondary battery 200 are the same male terminal type, a user does not need to determine which couple terminal of the load 251 is to be coupled with the connection terminal. Among the above-described connection terminals, any connection terminal can be electrically connected to one electrode respectively if it is coupled with the coupling terminals 262 and 263 equipped in the load 261.

According to the present disclosure, connecting a cable-type secondary battery to a charger or a load is facilitated. Also, a battery module may be easily built by electrically connecting cable-type secondary batteries in series or parallel.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A cable-type secondary battery comprising:
   at least one inner electrode layer including an inner electrode active material formed on a surface of an inner current collector having a horizontal cross section of a predetermined shape and extending in a lengthwise direction;
   a separation layer formed to surround the inner electrode layer; and
   an outer electrode layer formed to surround the separation layer, and including an outer electrode active material formed on a surface of an outer current collector, and
   the cable-type secondary battery further comprising:
   a first connection terminal that is electrically connected to the inner current collector and the outer current collector, and formed at one end of the cable-type secondary battery; and
   a second connection terminal that is electrically connected to the inner current collector and the outer current collector, and formed at the other end of the cable-type secondary battery,
   wherein each of the first and second connection terminals have an inner part and an outer part, the inner and outer parts having opposite polarities, wherein the inner part is electrically connected to one of the inner or outer current collector, and wherein the outer part is electrically connected to the other of the inner or outer current collector.

2. The cable-type secondary battery according to claim 1, wherein the first and second connection terminals each comprises an insulation layer made from an insulation material between an electrically connected part with the inner current collector and an electrically connected part with the outer current collector.

3. The cable-type secondary battery according to claim 1, wherein the first and second connection terminals are an earphone plug-shaped terminal.

4. The cable-type secondary battery according to claim 3, wherein a diameter of the earphone plug-shaped terminal is 3.5 mm.

5. The cable-type secondary battery according to claim 1, wherein the first and second connection terminals have at least one type selected from the group consisting of male-male, male-female, female-male, and female-female.

6. The cable-type secondary battery according to claim 1, further comprising:
   a protection coating surrounding the outer electrode layer.

7. The cable-type secondary battery according to claim 1, wherein the inner current collector is a pipe-type current collector, a wound wire-type current collector, a wound sheet-type current collector, or a mesh-type current collector.

8. The cable-type secondary battery according to claim 1, wherein the outer current collector is a pipe-type current collector, a wound wire-type current collector, a wound sheet-type current collector, or a mesh-type current collector.

9. The cable-type secondary battery according to claim 1, wherein the inner electrode layer is a negative or positive electrode, and the outer electrode layer is a positive or negative electrode opposite to the inner electrode layer.

10. A battery module comprising:
    a plurality of cable-type secondary batteries defined in claim 1,
    wherein, for the plurality of cable-type secondary batteries, the first connection terminal is a male or female terminal, and the second connection terminal is a female or male terminal matching to the first connection terminal, and
    the plurality of cable-type secondary batteries are electrically connected in parallel.

11. A secondary battery operating system comprising:
    a cable-type secondary battery defined in claim 1; and
    a load that is supplied with power from the cable-type secondary battery,
    wherein the load comprises:
    a first coupling terminal that is coupled with and electrically connected to only one electrode among the negative and positive electrodes of the first connection terminal of the cable-type secondary battery; and
    a second coupling terminal that is coupled with and electrically connected to only an electrode (positive or negative) opposite to the first coupling terminal, among the negative and positive electrodes of the second connection terminal of the cable-type secondary battery.

12. The secondary battery operating system according to claim 11, wherein the load is an electric bike, a power tool, an energy storage system, an uninterruptible power supply (UPS), a mobile computer, a mobile information communication terminal, a portable audio player, or a portable video player.

13. A cable-type secondary battery connection set comprising:
    a cable-type secondary battery defined in claim 1; and
    a connection device to electrically connect the cable-type secondary battery to a charger that supplies a required charging power to the cable-type secondary battery, or to a load that is supplied with power from the cable-type secondary battery,
    wherein the connection device comprises:
    a first coupling terminal that is coupled with and electrically connected to only one electrode among the negative and positive electrodes of the first connection terminal;
    a second coupling terminal that is coupled with and electrically connected to only an electrode (positive or negative) opposite to the first coupling terminal, among the negative and positive electrodes of the second connection terminal; and a third coupling terminal to electrically connect the first and second coupling terminals respectively to a positive or negative electrode of the charger or the load.

14. The secondary battery connection set according to claim 13, wherein the third coupling terminal of the connection device is of a universal series bus (USB) terminal type.

* * * * *